INVENTORS
Myron J. Brown &
Rathbun B. Squires
BY
ATTORNEY

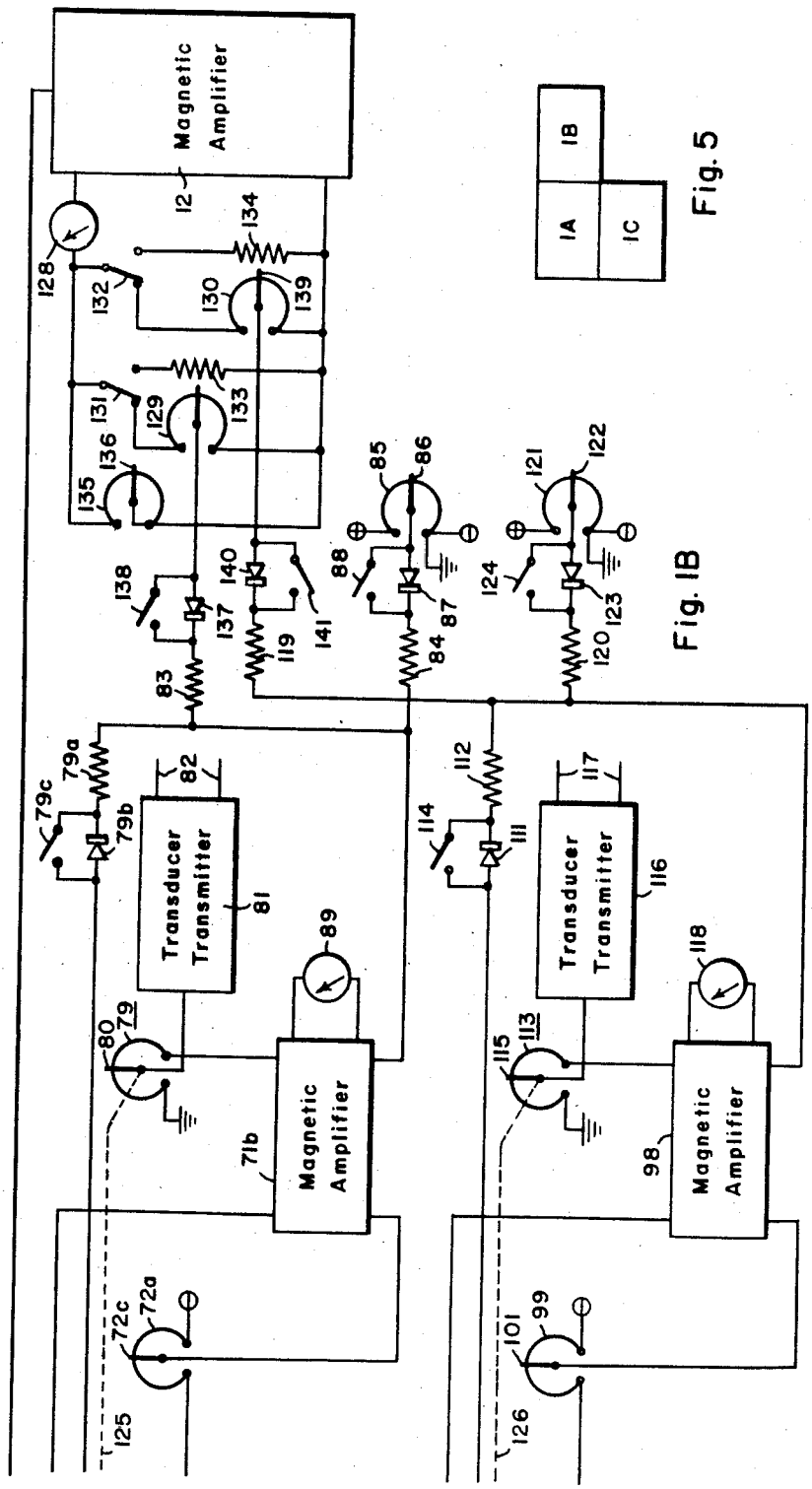

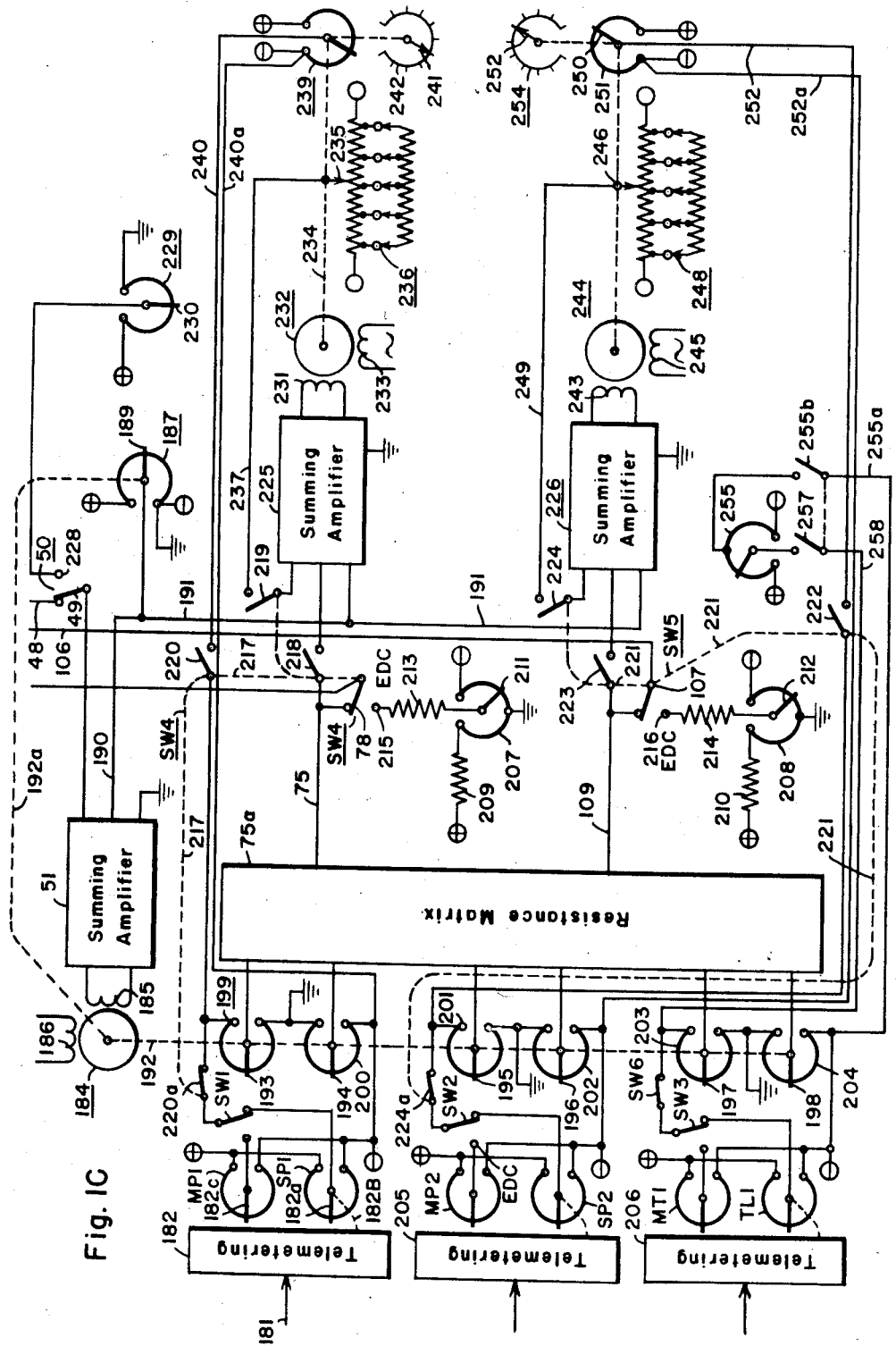
Fig. IC

United States Patent Office 2,888,575
Patented May 26, 1959

2,888,575
AUTOMATIC DISPATCHING SYSTEM

Myron J. Brown and Rathbun B. Squires, Forest Hills, Pa., assignors to Westinghouse Electric Corporation, East Pittsburgh, Pa., a corporation of Pennsylvania Application May 7, 1958, Serial No. 733,698

22 Claims. (Cl. 307—57)

This invention relates to an automatic dispatching system and more particularly to load sensing and frequency control of power generators located in separated stations in a power distribution system.

One of the systems used in the past for power system control was to provide fuel cost curves and machine operating curves on each of the machines of each station with the operator of the station controlling the operation of each generator in the station to assume certain power settings according to preset standards established over previous operating experience. The operator of the loading of each generator then selects the power setting of each generator in response to anticipated loads not knowing whether the loads will actually occur at the exact time selected or not.

It is therefore an object of this invention to provide equipment for a dispatching office capable of determining the actual power generation needed for a particular system and further provide control signals to each of the generators of the system to load the generators in response to economic conditions of each individual generator.

It is another object of this invention to develop a single control frequency in the dispatcher's office for controlling a specific generator to take on its share of the load on an economic basis.

It is another object of this invention to provide automatic economic dispatch computer control of each of the control frequencies going out to each of the generators.

It is another object of this invention to provide a minimum power setting for each generator in the system at which this generator would begin to assume its share of the load.

It is another object of this invention to provide a maximum load setting for the control of each generator in the system, this setting establishing the maximum economic load to be assumed by the associated generator.

It is another object of this invention to provide a summing circuit in which automatic selection of manual or system integrated costs is used depending upon which is higher and predominant.

It is another object of this invention to provide manual anticipation of peak load periods when such manual anticipation is desirable or necessary.

It is another object of this invention to provide control of the swing cost signal being delivered to the individual stations in response and comparison to the relative maximum setting allowed for the station.

It is another object of this invention to provide automatic system lambda control established by the system cost integrator in which lambda is the cost of incremental power delivered to the load center of an electric utility system and is represented by its symbol λ.

It is another object of this invention to provide a control system utilizing an economic dispatch computer capable of automatic control or separate transmission loss computations for future load periods as desired by the operator of the dispatching office.

It is still another object of this invention to provide approximate transmission loss manual control signals for the control system during periods of economic dispatch computer operation for future load transmission loss anticipation.

It is another object of this invention to provide magnetic amplifier summation control in integrated cost control of the system to produce an output control signal for each generator.

It is still another object of this invention to provide a station load proportioning circuit controlled by the station signal received from the dispatching office to establish the load each individual generator in the station will accept.

Other objects, purposes and characteristic features will become obvious as the description of the invention progresses.

In practicing this invention, there is provided a dispatching office or control center capable of sampling the system power lines to determine any increase or decrease in load through any frequency errors as well as sampling the system tie lines to provide for system control in response to power flow in or out of the system over the associated tie lines. The dispatching office also is provided with manual controls for feeding into the control system manual anticipation of increased loads and manually set tie line interchange signals as deemed necessary by the dispatching office operator. These signals are summed and used as inputs to a system cost integrator circuit capable of providing system trend outputs in response to the prior mentioned inputs and an additional cost of transmission loss input also, provided for system cost integrator control. In addition, the tie-line and system load circuits as well as the manual control circuits are used as inputs in a swing follower control capable of making very rapid changes in response to sudden system requirement changes. The cost integrator signal and swing signals are then summed and modified for each station conditions and transmitted as frequency signals to each station in the system. At each station a load proportioning servo then dictates the load of each generator in the station in response to the incoming frequency from the dispatching office. In order to provide accurate system and realistic system loading, the power output of each of the generators in a station is summed together and transmitted back to the dispatching office over suitable telemetering circuits and applied to an economic dispatch computer which during automatic operation uses this information and the system trend control lambda follower to automatically include a signal proportional to transmission losses for the individual stations. This transmission loss is computed as being the transmission loss from the station to the system load center. In addition, manual controls are provided which establish simulated input signals to the dispatching office controls while the economic dispatch computer is being used for computing transmission losses for future load conditions.

Figures 1A, 1B and 1C are diagrammatic views of the circuit found in the dispatching office of the control system.

Figure 1A:
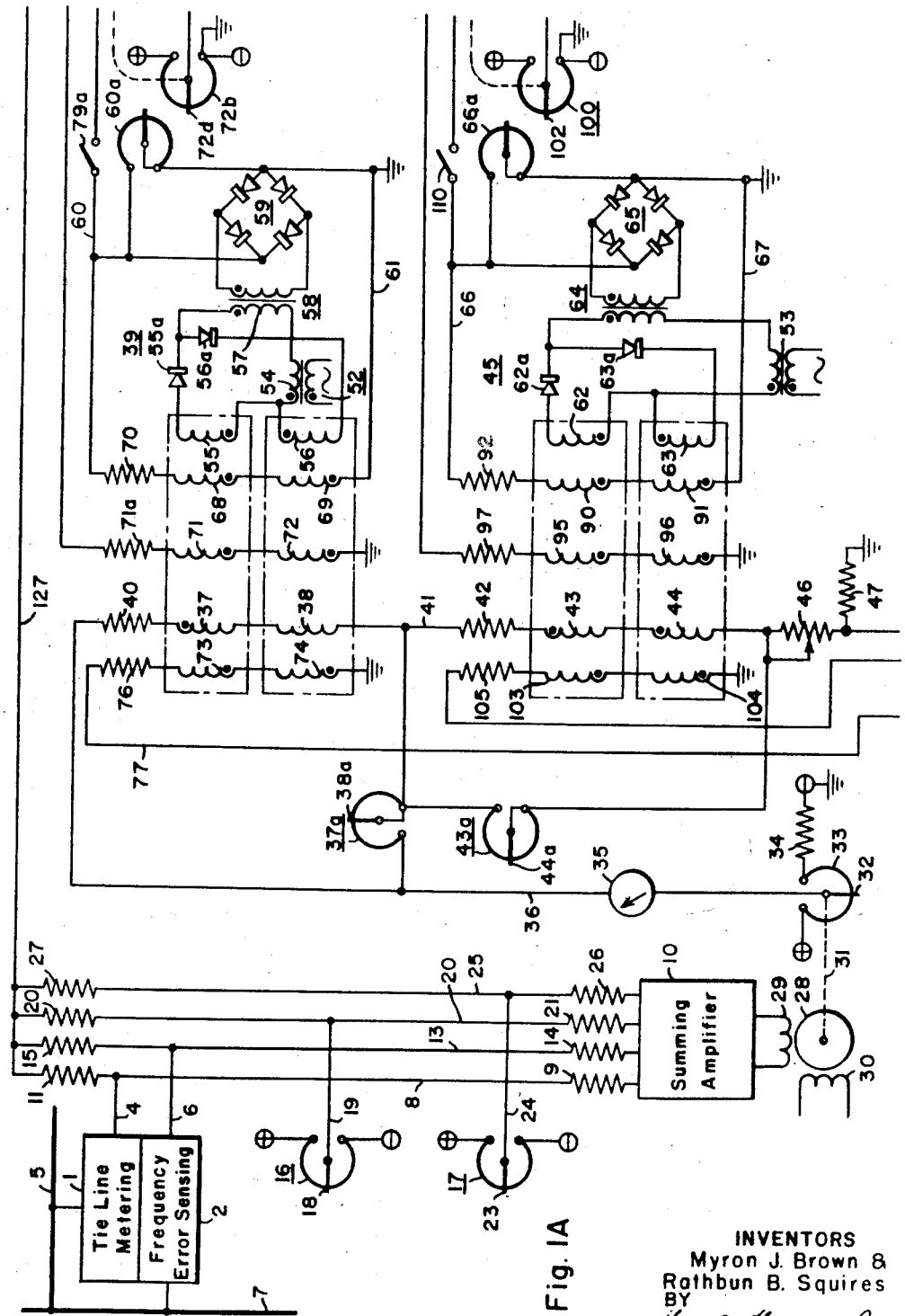

Figs. 3 and 4 are typical response control curves of the magnetic amplifiers for stations 1 and 2, respectively.

Fig. 5 is a view of the sheet layout utilized for placement of the figures of the drawing.

In each of the views similar parts will bear like reference characters.

The dispatching office shown in Figs. 1A, 1B and 1C will now be described in which tie-line sampling and frequency error sensing from the system transmission line are provided through the tie-line sampling circuit 1 shown in block form and the frequency error sensing circuit 2 shown also in block form, and completely described in the copending Westinghouse application, Serial No. 733,761, filed May 7, 1958, inventor Myron J. Brown, entitled "Load and Frequency Control of Power Generating Systems" and assigned to the common assignee. The exact circuits therefore will not be shown in this application, but it is felt sufficient to state that a voltage is produced on the conductor 4 in response to tie-line power flowing through the tie-line circuit 5 through the operation of the circuit shown in block form as 1. Likewise, a voltage is produced on the output conductor 6 in response to frequency changes in the system power transmission line 7 by the circuit of element 2. The output conductor 4 is connected to a conductor 8 which is in turn connected through a summing resistor 9 to the input of a direct current amplifier 10 utilized as the input to the system cost integrator circuit. The conductor 8 also connects to an input resistor 11 in the control of a magnetic amplifier 12, of any suitable type, having rapid response characteristics and utilized for rapid swing control to be explained hereinafter. Likewise the output conductor 6 is connected to a conductor 13 having a series summing resistor 14 connected to the input of the amplifier 10 in parallel with the tie line metering signal previously described. The conductor 13 is also connected through a summing resistor 15 to the magnetic amplifier 12 for swing control input. In addition to the tie line and frequency error inputs to the amplifiers 10 and 12, there may be provided manual control inputs by the manual control potentiometers 16 and 17 for the purpose of providing manual anticipation of sudden load changes and manual anticipation of sudden interchange setting signals, respectively. The potentiometer 16 has a slide contact 18 connected through a conductor 19 to a conductor 20 that is in turn connected through the summing resistors 21 and 22 to the amplifiers 10 and 12, respectively. The potentiometer 16 is connected across a suitable direct current source of power and is grounded at its midpoint to provide signals above and below ground potential. The potentiometer 17 is also provided with a battery or suitable direct current source connected thereacross with the midpoint of the potentiometer 17 being grounded to provide signals above and below ground potential. A sweep arm 23 of the potentiometer 17 is connected through a conductor 24 to a conductor 25 which is in turn connected through the summing resistors 26 and 27 to the amplifiers 10 and 12, respectively. In order to provide basic station control, the system cost integrator circuit or trend signal circuit, involving the amplifier 10 controlling a two-phase motor 28 having one of its field windings 29 energized by the amplifier 10 and the other winding 30 energized by a suitable reference source of alternating current power is provided. The armature of the motor 28 is connected through a mechanical linkage 31 to the sweep arm contact 32 of a cost of lambda developing potentiometer 33 connected across a suitable source of power through a series resistor 34 which is grounded. The purpose of the series resistance 34 is to provide a minimum voltage level on the potentiometer when the sweep arm 32 is in its lower extreme position since economic dispatch of power cannot be properly established below a level of 20% of the system total power. The potential of the potentiometer 33, therefore, operates between the 20% level and the maximum 100% level for control purposes. The voltage provided by the potentiometer 33 can then be called cost of system power lambda ($\lambda$) or incremental system cost of power and can be indicated by the lambda meter 35 connected in series in the conductor 36 leading from the sweep arm 32 to the main control windings 37 and 38 of the suitable control magnetic amplifier 39 used to control current signals for station 1. The main control windings 37 and 38 have connected in series therewith a resistor 40 used to cause the control of the magnetic amplifier to occur at relatively high voltages where rapid response takes place in small voltage changes.

Connected in parallel with the main control windings 37 and 38 is a variable resistor 37a having a movable tap 38a for the purpose of providing a bypass path for a certain portion of the current provided by the potentiometer 33. By adjusting the resistor 37a, the range over which the magnetic amplifier 39 will operate is established. The variable resistor 37a is needed in view of the fact that the control windings for each of the magnetic amplifiers in the integrated cost control are connected in series in order to be energized by the system $\lambda$ cost potentiometer 33.

As pointed out, the output conductor 36 not only supplies the main control windings 37 and 38 of the magnetic amplifier 39, but is also connected through a suitable conductor 41 to other series resistances, parallel resistances, and main control windings such as the series resistance 42 and main control windings 43 and 44 and their shunt resistor 43a of the magnetic amplifier 45 used to control station 2. A multiplicity, such as twenty magnetic amplifiers may be controlled by being series connected through their main control windings similar to that described in connection with the magnetic amplifiers 39 and 45. For simplification, only two have been shown in this application. After passing through the main control windings 43 and 44 of the last magnetic amplifier having in parallel therewith a variable resistor 43a having a movable arm 44a, such as the magnetic amplifier 45 in this application, the main control winding circuit is connected through a signal limiting resistor 46 to a voltage developing resistor 47 which is connected between the conductor and ground. The voltage developed across the resistor 47 is then fed over conductor 48 to the contact 49 of a suitable switch 50 which is connected to the input of a lambda follower amplifier 51, the purpose of which will be described hereinafter.

The magnetic amplifiers 39 and 45 are provided with square loop hysteresis cores supplied with energy from a suitable alternating current source, not shown, over the transformers 52 and 53, respectively. The transformer 52 has a secondary 54 which is parallel connected to the main windings 55 and 56 wound about the cores of the magnetic amplifier 39 through a pair of rectifiers 55a and 56a, respectively, and the primary 57 of an output transformer 58 whose secondary is connected through full wave rectifier 59 to form the output terminals of the magnetic amplifier 39, connected across output conductors 60 and 61. The output conductors 60 and 61 are provided with a suitable variable ballast resistor 60a connected thereacross. The purpose of the transformer 57 and full wave rectifier 59 is to reduce the output of the magnetic amplifier 39 to zero during zero input signals. The magnetic amplifier 45 is also provided with energizing coils 62 and 63, similar to the coils 55 and 56 of the magnetic amplifier 39, and a series connected output transformer 64 connected to a full wave rectifier 65. The output terminals of the rectifier 65 are connected across the output conductors 66 and 67 of the magnetic amplifier 45.

Referring now to the magnetic amplifier 39, it can be seen that the output conductors 60 and 61 are provided with series connected stabilizing feedback coils 68 and 69 associated with the cores of the magnetic amplifier 39 and a series resistance 70 utilized to command a definite feedback control voltage at all times.

In addition to the main control winding, there is provided a lower limit setting pair of control windings 71 and 72 series connected through a minimum response control resistor 71a, a metering magnetic amplifier 71b, a basic minimum response variable resistor 72a and an added bias setting variable potentiometer 72b. The added bias potentiometer 72b is connected across a source of power of any suitable type, preferably direct current, one terminal of which is connected to ground to complete the control circuit. If we assume that the curve shown in Fig. 3 is a typical response curve for the magnetic amplifier 39, it can be seen that the potentiometer 72a has its movable arm 72c adjusted to a minimum bias capable of establishing the initial point C in the typical response curve D. This minimum point C can be obtained only when the potentiometer 72b has its sweep arm 72d moved to the extreme position adjacent to the ground connection. The purpose of the potentiometer 72b providing added bias will be explained in connection with the slope setting potentiometer hereinafter.

In addition to the previously mentioned bias control circuits, the magnetic amplifier 39 is provided with series connected, transmission loss, bias control windings 73 and 74 connected between ground and the output conductor 75 of a transmission loss matrix 75a associated with an economic dispatch computer through a voltage limiting resistor 76, conductor 77 and disconnect switch SW4. The disconnect switch SW4 is of any suitable manually controlled type capable of switching the operation of the economic dispatch computer from participation in automatic control of the system to isolated operation as an economic dispatch computer solving problems involving past, present, or future conditions, as will be explained hereinafter. For the present, it is felt sufficient to state that the voltage applied to the conductor 75 and control windings 73 and 74 is capable of causing a decrease in the output of the magnetic amplifier 39 that is proportional to the cost of transmission losses occurring in the system transmission lines in response to the power being delivered by station 1.

The output of the magnetic amplifier 39 occurring on the output conductor 60 and grounded output conductor 61 is then applied through a series rectifier 79b, summing resistor 79a and metering magnetic amplifier 71b to a slope setting potentiometer 79. The rectifier 79b is provided with a shunting switch 79c and is used to limit the control of the magnetic amplifier 39 on station 1 by causing the magnetic amplifier to provide control only when its voltage is above other summed voltages applied to the slope setting potentiometer 79, as will be explained hereinafter. The slope setting potentiometer 79 establishes the cost range control for the magnetic amplifier 39 when controlling station 1 and may be adjusted between 100% and 200%. If the fuel and other costs of operating the station are higher than costs of other stations in the system, the operational bottoms setting potentiometer 72b is adjusted to raise the bias on the magnetic amplifier 39 above the initial point setting potentiometer 72a level to prevent station 1 participation in assuming additional load until the combined bottom setting bias is overcome. As the bottom setting bias is increased the slope of the station response is changed by the potentiometer 79 since the higher the bottom setting bias is adjusted, the greater the cost of producing each incremental addition of power. The potentiometer 79 is provided with a sweep arm 80 connected to a suitable output transducer 81 capable of converting the voltage selected by the sweep arm 80 to a control frequency to be transmitted to station 1 for control purposes over the conductors 82.

In addition to the output voltage of the magnetic amplifier 39 received through the summing resistor 79a, additional voltages are received through the summing resistors 83 and 84 which are added to the magnetic amplifier output and applied through the metering magnetic amplifier 71b to the potentiometer 79. The voltage being received through the summing resistor 83 is received from a swing control circuit to be explained hereinafter but is a voltage that is added to the output voltage of the magnetic amplifier 39. The voltage received from the summing resistor 84 is developed across a potentiometer 85 that has a manually adjusted sweep arm 86 for adjusting the output voltage to be applied to the summing resistor 84. The potentiometer 85 is connected across a suitable source of power, not shown. The output voltage selected by the manual sweep arm 86 is applied to the summing resistor 84 through a rectifier 87 having a manually operated shunting contact 88. The purpose of the rectifier 87 is to limit the manual participation dictated by the sweep arm 86 in a manner similar to the rectifier 79b described hereinbefore.

The magnetic amplifier 71b is of any suitable type such as radius transducer, and is provided with control windings associated with the bottom setting control circuits established by the windings 71 and 72 of the amplifier 39 and slope setting participation of amplifier 39 established by the slope setting potentiometer 79. The magnetic amplifier 71b is provided with a meter 89 controlled to read station cost established by the bottom setting and slope controls applied to the magnetic amplifier 71b.

The magnetic amplifier 45 is provided with output windings 62 and 63 positioned on its cores and connected in parallel across a power transformer 53 through the rectifiers 62a and 63a, respectively, and an output transformer 64 and in full wave rectifier 65 to the output conductors 66 and 67. A pair of series connected feedback windings 90 and 91 are also connected to said conductors 66 and 67 through a series voltage limiting resistor 92. In addition, magnetic amplifier 45 is provided with a pair of series connected windings 95 and 96 connected through a voltage participation limiting resistor 97, a metering magnetic amplifier 98 and a basic initial bias potentiometer 99 to an additional bias setting potentiometer 100. One end of the series connected bias windings 95 and 96 is connected to ground, and the added bias potentiometer 100 is connected across a source of power, one terminal of which is also connected to ground. The positions of the sweep arms 101 and 102 of the bottom setting potentiometers 99 and 100, respectively, determine the initial point or bottom point in the operation of the magnetic amplifier 45, the curves of which are shown in Fig. 4. The initial points shown in Fig. 4 are the points E and F with the point E being established by the potentiometer 99 and the additional bias reaching as high as the point F being established by the potentiometer 100. Operation of this circuit is similar to the bottom setting circuit described in connection with potentiometer 39. The output 66 and 67 have connected thereacross a variable ballast resistor 66a for stabilizing purposes.

The magnetic amplifier 45 is also provided with a transmission loss set of windings 103, 104 connected through a voltage participating limiting resistor 105 and a conductor 106, and the contact 107 of the switch 108 in one of its extreme positions to the conductor 109 leading from the transmission loss matrix 75a. As explained in connection with the magnetic amplifier 39, the conductor 109 provides a voltage capable of reducing the output of the magnetic amplifier 45 by an amount equivalent to the cost of transmission loss encountered by the power being delivered from station 2.

The output conductor 66 for the magnetic amplifier 45 is connected through a suitable disconnect switch 110, series connected rectifier 111, series summing resistor 112, a control winding of the magnetic amplifier 98 to one terminal of the slope setting potentiometer 113 having its other terminal connected to ground. The participation limiting rectifier 111 is provided with a shunting contact 114 and is used to limit participation in the manner similar to the rectifier 79b described hereinbefore in connection with the magnetic amplifier 39. The slope setting potentiometer 113 has a movable sweep arm 115 connected to an output transducer 116 capable of converting the slope setting voltage into a frequency for transmission to the station 2 over the conductor 117. The control windings of the magnetic amplifier 98 connected in the bottom setting and slope setting circuits control the output of the magnetic amplifier connected across the station cost meter 118 to indicate the station cost being dictated by the magnetic amplifier 45. In addition to the magnetic amplifier 45 output voltage received over the summing resistor 112, the slope setting potentiometer 113 is provided with a swing participation voltage over the summing resistor 119 and a manual control setting voltage over the summing resistor 120. The source of swing participation received over the summing resistor 119 will be explained hereinafter. The manual control voltage received over the summing resistor 120, however, is developed by a potentiometer 121 which is connected across a suitable source of voltage and provided with a sweep arm 122 connected through a participating limiting rectifier 123 to the summing resistor 120. The rectifier 123 is provided with a shunting contact 124 similar to the other rectifiers described hereinbefore. The purpose of the shunting contacts for the rectifiers in the former circuit is to provide rectifier elimination in the circuit whenever desirable.

In it pointed out that the slope setting potentiometer 79 and the bottom setting, added bias potentiometer 72b are mechanically conneced together by a mechanical link 125 in order to cause the participation of the magnetic amplifier from the load setting position indicated by the curve D in Fig. 3 to the maximum or 200% participation indicated by the curve G in Fig. 3 with a corresponding move of the bottom setting point H established by the added bias potentiometer 72b. Similarly, the slope setting potentiometer 113 and the bottom setting added bias potentiometer 100 controlling the magnetic amplifier 45 are mechanically linked by the mechanical linkage 126 to provide the curves J and K displayed in Fig. 4 having the bottom points E and F established by the potentiometers 99 and 100, respectively.

The circuit described thus far involving the magnetic amplifiers 39 and 45 is for the purpose of providing integrated cost control or trend control of the stations 1 and 2 of this system. In addition, however, it is desirable to provide a swing control which responds to rapid, as well as small changes in the system, as dictated by the frequency sensing circuit 2 and the tie-line metering circuit 1. In addition, it is desirable to provide the swing control with an output from the manual control potentiometers providing manual anticipation of load changes and manual scheduling of interchange. These voltages are summed over the resistors 11, 15, 20 and 27 and applied over the conductor 127 to the swing control magnetic amplifier 12. The swing control magnetic amplifier 12 can be of any suitable type, the details of which are not shown herein but which is provided with an output circuit to an output meter 128 connected to swing participation potentiometers 129 and 130 for stations 1 and 2, respectively. The potentiometers 129 and 130 are connected to the output conductors of the magnetic amplifier 12 through disconnect switches 131 and 132, respectively, capable of moving to their opposite extreme positions to place the output conductors through parallel absorption resistors 133 and 134, respectively. Also connected across the output conductors of the magnetic amplifier 12 in parallel with the participation potentiometer and absorption resistors is a ballast resistor 135 provided with a variable type arm 136 adjusted to a metered calibration for loading the swing participation of the magnetic amplifier or properly for the number of magnetic amplifiers used in the cost integration circuit. The potentiometer 129 is connected through a participating limiting rectifier 137 to the summing resistor 83 in the slope setting circuit previously described. The rectifier 137 has a parallel shunting contact 138 for removing the effects of the rectifier from the circuit when desired. Likewise, the swing participation potentiometer 130 is provided with a control arm 139 connected through a rectifier 140 to the summing resistor 119 previously described. The rectifier 140 is provided with a shunting contactor 141 for removing its effects from the circuit when it is desired. The swing participation resistors 129 and 130 are adjusted to the maximum swing participation desired by the dispatcher for the associated station 1 or 2, respectively, to limit the swing participation to an effective value proportional to the trend participation established for the station.

The output from the magnetic amplifier 39 is summed with the swing participation voltage from the summing resistor 83 and the manually controlled voltage from the summing resistor 84 and applied to the slope setting potentiometer, for voltage signal output to station 1. The summed voltages are applied through rectifiers 79b, 137 and 87 to allow the highest voltage of the summed voltages to control the output, whether it be the swing, integrated cost or manual voltage. If the predominating voltage falls below either of the other voltages, it would immediately lose control to the new highest voltage.

The same arrangement exists for each of the other station control signal outputs, for example, the control for station 2 fed by the magnetic amplifier 45 swing participation potentiometer 130 and manual control 121.

The transducers 81 and 116 provide output signals over the conductors 82 and 117 to the stations 1 and 2 with the signals preferably being in the form of a controlled frequency that is proportional to the voltage established by the potentiometers 79 and 113, respectively. Since the control of stations 1 and 2 is identical, an explanation of the station 1 only will be made.

Figure 2:
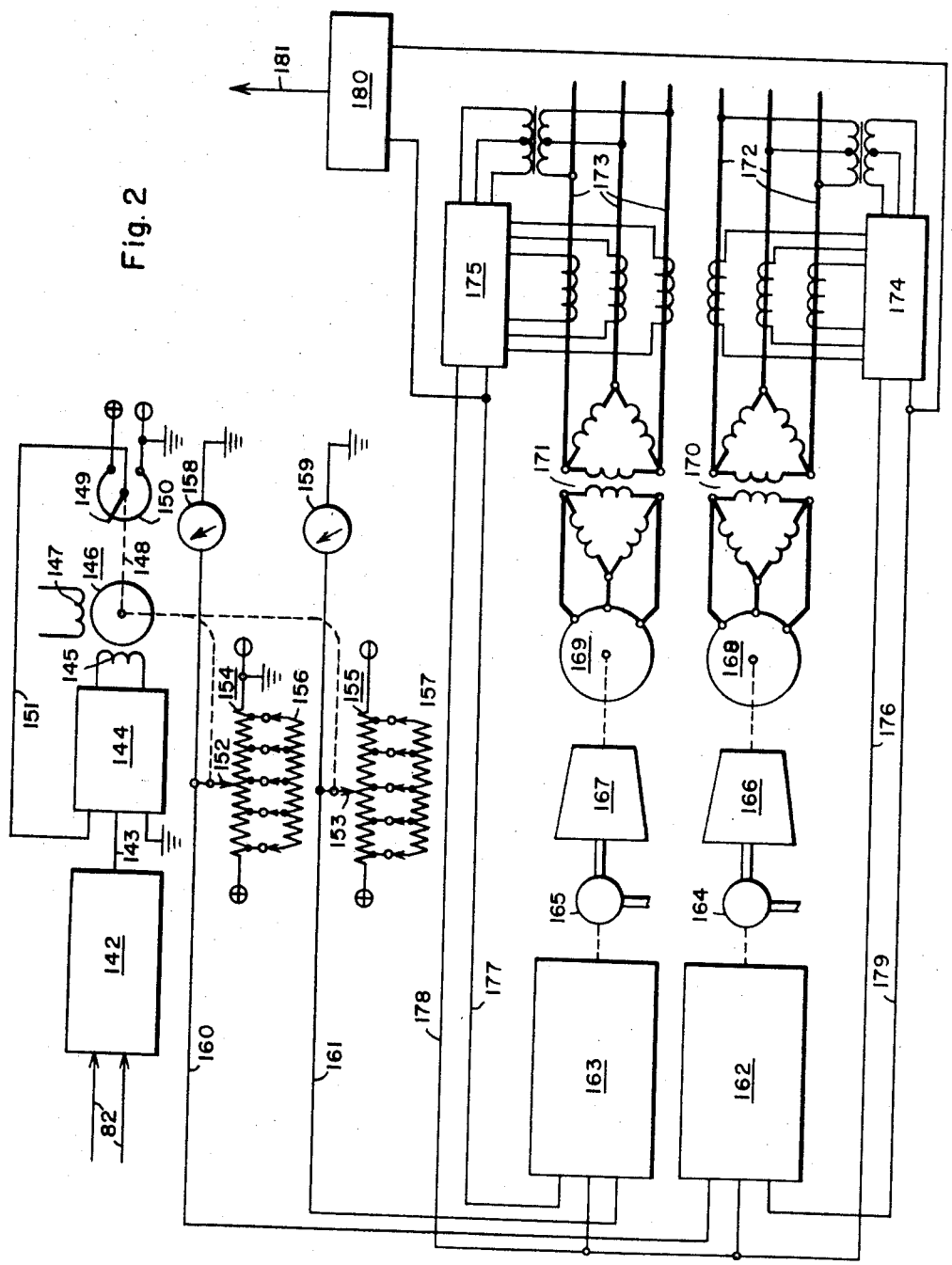
Fig. 2 is a diagrammatic view of the circuit in a typical generating station involving two generators within the station.

The signal transmitted from the transducers 81 or 116 may be in the form of a signal voltage but is preferably converted into a frequency developed by the transducer of a transmitter type and supplied over the conductors 82 and 117 to respective stations 1 and 2. Referring now to station 1, Fig. 2, it can be seen that the control frequency supplied by the transducer 81 over the conductors 82 will be applied to the frequency receiver transducer 142 which is capable of again converting the transmitted frequency into a reference voltage. The frequency receiver transducer 142 may be of any suitable commercially available type. The output of the transducer 142 is passed over the conductor 143 to the input of the D.C. amplifier 144 whose output is used to control the winding 145 of a suitable two-phase motor 146 provided with a reference winding 147 energized by any suitable source of power, not shown. Movement of the armature of the motor 146 rotating the shaft 148 displaces a movable arm 149 of a potentiometer 150 connected across a suitable source of D.C. power, not shown. The movable arm is then connected to a conductor 151 which is connected to the input of the amplifier 144 as a feedback control for positioning motor angle proportion to the input of the amplifier 144 and its two-phase motor 146. The output motion of the armature of the motor 146 versus the output voltage on wire 160 represents a cost curve of the power needed to be produced at station 1 in response to the needs of the system dictated by the dispatching office signal. The armature motion is applied to the movable arms 152 and 153 of the cost curve potentiometers 154 and 155, respectively. The cost curve potentiometers are provided with plug-in type parallel resistors 156 and 157 respectively, resulting in a non-linear characteristic in the output of the potentiometers on their movable arms 152 and 153. The movable arms are then connected through suitable load assignment meters 158 and 159 respectively to ground to give a visual indication of the load assignment assigned to each of the generators of the station. The movable arms 152 and 153 are also connected through the conductors 160 and 161 to generator governor control circuits 162 and 163 respectively capable of dictating a change in the associated steam valves 164, and 165, respectively, capable of delivering steam to the turbines or prime movers 166 and 167, respectively. In response to a change in steam valve positions and turbine or prime mover speed changes, the alternators 168 and 169 change their outputs through the three phase transformers 170 and 171, respectively, to the output bus bars 172 and 173, respectively. In order to provide adequate stabilization of the generator governor controls, thermal converters 174 and 175 are provided for sampling the output power of each of the respective generators 168 and 169. The voltage developed by the thermal converters in response to the power output of each generator is fed back through the conductors 176 and 177, respectively, to the inputs of the generator governor controls 162 and 163, respectively. These outputs then act as stabilizing feedback control on the generators 168 and 169 in response to the thermal converters 174 and 175, respectively.

The outputs of thermal converters 174 and 175 are then connected in series through the conductors 178 and 179 and connected into a frequency transducer transmitter 180 capable of providing an output frequency on the conductor 181 that is proportional to the total output of the summed generators. This output is then transmitted over the conductor 181 to telemetering equipment 182, for station 1 at the dispatching office, capable of producing voltages representative of station power using the telemetering equipment 182 to drive the station power potentiometer SP1 movable arm 182a by the mechanical link 182b. The potentiometer SP1 is energized by a suitable source of power, not shown. The input from the telemetering equipment 182 and power potentiometer SP1 is then fed through the switch SW1 in one of its extreme positions to the lambda follower multiplying potentiometer 199 for automatic control conditions. When the contact of the switch SW1 is moved to its other extreme position, the manual potentiometer MP1 is active with its sweep arm 182c connected to the potentiometer 199. The potentiometer MP1 is connected across the source of direct current used for the potentiometer SP1, not shown.

The telemetering equipment for station 2 and the tie line includes the potentiometer SP2 and TL1 acting as an automatic telemetering control for station 2 and tie line 5, respectively. For manual simulation during telemetering failure, the potentiometers MP2 and MT1, respectively, are provided and connected similar to the potentiometer MP1 used for station 1. The potentiometer MP2 or MT1 are selectively connected to the plus P line of station 2 or the tie line, respectively, through the switches SW2 and SW3, respectively.

During automatic control, each station power produced by the automatic potentiometer such as the potentiometer SP1 for station 1 is fed through the respective associated potentiometers 199 through 204, driven by the λ amplifying following motor 184, fed through the transmission loss matrix 183 and used for direct control in each of the magnetic amplifiers 39 and 45. The signal received from the lambda following multiplying potentiometers 199 through 204 for each station and tie line appears as plus and minus λP since the elemetering equipment provides the power for the station and the potentiometers 199 through 204 provides the λ control modification of the power resulting in λP plus or minus depending upon the associated potentiometer. As described hereinafter, the system λ voltage is developed across the resistor 47 in response to the system cost integrator potentiometer 33 voltage. The lambda modification of the station power is provided through the use of a two-phase motor 184 provided with a control winding 185, controlled by the previously mentioned system λ follower amplifier 51, and a reference winding 186 energized by a suitable alternating current reference voltage, not shown. The rotor of the λ follower motor 184 is connected to a potentiometer 187 through a suitable mechanical linkage 192. The potentiometer 187 is connected across a suitable source of power, not shown.

The potentiometer 187 has a movable sweep arm 189 connected through the conductor 190 to the input of the summing amplifier 51. Also connected to the sweep arm 189 is a conductor 191 used to produce a system value, the use of which will be explained hereinafter in connection with the economic dispatch computer operation. The motor 184 armature through its mechanical linkage 192 then connects to the movable arm 189 of the potentiometer 187 and to movable arms 193, 194, 195, 196, 197 and 198 of suitable potentiometers 199 through 204 used to modify the station power value with system cost values for stations 1 and 2 and the tie line connection shown in the present disclosure. The potentiometers 199 and 200 are connected in series across the +P and −P conductors coming out of the telemetering equipment 182 associated with station 1 with the center point between the two potentiometers grounded. Likewise the potentiometers 201 and 202 are connected in series across the +P and −P conductors associated with the telemetering equipment 205 for station 2 with the center point between the series connected potentiometers being grounded. The potentiometers 203 and 204 are also connected in series across the +P and −P conductors received from the telemetering equipment 206 associated with the tie line conductors 7 with the midpoint between the two potentiometers being grounded in a manner similar to those described above. The movable arms 193 through 198 are driven simultaneously toward +P and −P or toward ground by the mechanical linkage 192 of the two-phase motor 184 controlled by the amplifier 51. The output voltages appearing on the movable arms 193 through 198 is then fed into a suitable transmission loss matrix similar to the loss matrix described in copending application 28,598, inventor Edwin L. Harder, Serial No. 556,149, filed December 29, 1955, titled "Analog Computer" and assigned to the common assignee. The loss matrix then modifies the voltages applied by the potentiometers 199 through 204 resulting in a transmission loss cost voltage for each station. The transmission loss matrix uses the power analog of the stations 1 and 2 and the tie line to obtain transmission loss analogs which are applied through the previously mentioned conductors 75 and 109 to the magnetic amplifiers 39 and 45 to modify their outputs in response to transmission loss cost. This description is proper for automatic control of the generating stations in response to total system needs as determined by the dispatching office equipment.

There are times, however, when it is desirable to operate the system automatically while at the same time using the economic dispatch computer for computing future transmission losses or future problems to be anticipated. For this operation it is necessary to simulate the transmission loss as near as possible by adjusting the manual potentiometers 207 and 208 to the known values of transmission loss presently encountered or expected to be encountered while the economic dispatch computer is being used for future computations. The potentiometers 207 and 208 are connected across suitable voltage sources, not shown, with each having a series resistor 209 and 210 respectively, for establishing the maximum voltage variation possible by the potentiometers 207 and 208, respectively. The potentiometers 207 and 208 are center tapped to ground to provide either positive or negative operator established cost of transmission loss voltages. The movable arms 211 and 212, respectively, are then connected through series resistors 213 and 214 respectively, to contact points 215 and 216, respectively, capable of being engaged by the movable arms of the manual control switches SW4 and SW5, respectively. With the movable contacts in the position contacting the fixed points 215 and 216, voltages are supplied to the conductors 77 and 106 simulating transmission losses for the magnetic amplifiers 39 and 45. Connected to the movable arm 78 of the switch SW4 is a mechanical link 217 mechanically ganging movable contact members 78, 218 through 220 which are normally in their open position and 220a in its closed position during automatic operation. These contacts become closed when the contact member 78 of the switch SW4 is contacting the fixed point 215 or in other words, during economic dispatch operation and not automatic control. Likewise the movable arm 107 of the switch SW5 is provided with a mechanical linkage 221 interconnecting the movable contacts 107, 222 through 224 and 224a, causing these contacts to be moved in unison with contacts 107 and 222 through 224 being closed, and the contact 224a becoming open when the contact point 216 is engaged by the movable contact member 107 in the switch SW5.

At the same time that the switches SW4 and SW5 are moved to the reverse or economic dispatch computer position, the lambda voltage on the conductor 191 is used as an input to the control summing amplifiers 225 and 226 associated with the economic dispatch computer portion for the stations 1 and 2, respectively. The movable contact member 49 of the switch 50 interrupts the automatic λ voltage being applied to the amplifier 51 and contacts the fixed point 228. The closure of the member 49 and the fixed point 228 causes the supply of the system incremental cost signal to the amplifier 51 from a manual potentiometer 229, which is connected across a suitable source of power, not shown, and provided with a movable sweep arm 230 connected to the fixed contact point 228 of the switch 50. With the potentiometer 229 supplying the signal into the amplifier 51 to control the position of the servo motor 184, the potentiometer 187 is active to supply a positioning control to the amplifier 51 as well as λ voltage to the amplifiers 225 and 226 over the conductor 191.

With the movable contact member 218 closed, the transmission loss matrix voltage appearing on the conductor 75 is now supplied as an input to the amplifier 225 in conjunction with the λ voltage supplied over the conductor 191 to produce an output in the control winding 231 of the servo motor 232 provided with a reference winding 233. The movement of the armature of the motor 232 rotating a mechanical linkage 234 then drives a movable member 235 of a non-linear cost curve potentiometer 236 for station 1 of a type similarly described in connection with the description of station 1. The potentiometer 236 is connected across a suitable voltage source with the voltage appearing on the potentiometer movable member 235 being fed back over the conductor 237 and a now closed contact 219 of the switch 78 as a feedback voltage into the amplifier 225. This voltage appears as a stabilizing voltage for the servo motor 232. In addition, the linkage 234 drives the movable member 238 of a suitable potentiometer 239 placed across a suitable voltage source, not shown, the movable arm voltage of which is fed back over the conductor 240 and the now closed contact 220 of the switch 78 to the +P conductor for station 1 to appear as a +P input voltage to the transmission loss matrix 75a through the potentiometer 199. The potentiometer 239 has one end connected to the —P conductor by the conductor 240a to provide a —P voltage. The linkage 234 also has connected to it the movable arm 241 of a suitable power indication meter 242 for station 1.

In a similar manner the transmission loss cost output on the conductor 109 is connected through the now closed contact 223 of the switch 98 and appears as an input into the amplifier 226 along the lambda voltage appearing on the conductor 191. The output of the amplifier 226 is fed into a control winding 243 of a suitable two-phase motor 244 provided with a reference winding 245 energized from a suitable source of power. The armature of the motor 244 drives the mechanical linkage 246 which is in turn connected to a movable potentiometer arm 247 of a suitable non-linear cost curve potentiometer 248 similar to the cost curve potentiometer described in connection with station 1. The voltage of the movable tap 247 is then passed over the conductor 249 and the now closed contact member 224 of the switch 98 and appears as a feedback voltage into the amplifier 226. In addition, the shaft or mechanical link 246 controls a movable arm 250 of a suitable potentiometer 251 connected across a suitable voltage source, not shown. The voltage appearing on the movable arm 250 is then passed over the conductor 252 and a contact member 222 now closed to the +P conductor coming from the potentiometer SP2 of the telemetering equipment for providing a +P voltage for station 2. One end of the potentiometer 251 is connected to the —P conductor for station 2 over the conductor 252a to provide a —P voltage. These voltages are then applied to the potentiometers 201 and 202, respectively, for application to the transmission loss matrix 75a. The mechanical linkage 246 is then connected to a movable indicator arm 253 of a suitable power indicator meter 254 for the associated station 2 indicating the station 2 power output setting for the conditions established by the manual controls of the economic dispatch computer.

The tie line power to be delivered or received under the projected or assumed conditions of the problem of economic dispatch is a quantity changed by the operator of the economic dispatch computer, with the representative power being supplied by a manually set voltage from the potentiometer 255 connected across a suitable source of power, not shown, with the potentiometer connected at its center point through the conductor 255a and switch 255b (now closed) to the —P conductor. The movable arm 256 of the potentiometer 255 is connected through a suitable disconnect switch 257, closed only during economic dispatch computer operation and not in automatic control, to supply a voltage over the conductor 258 to the +P conductor associated with the tie line telemetering equipment 206. These voltages being fed into the transmission loss matrix 75a then provide future transmission tie line powers as one element in the loss matrix computations.

Operation of the transmission loss or economic dispatch computer portion of the circuit will now be described briefly for clarification purposes. With the switches SW4 and SW5 moved to the EDC extreme positions and the switches SW1, SW2 and SW3 moved to their off positions, the operator through the potentiometer 229 can adjust an input signal to the amplifier 51 establishing the lambda value for the system as a whole for the future condition being established by the economic dispatch computer.

With the switch contacts 220, 222, 255b and 257 closed in their EDC positions and contacts 220a, 224a and SW6 in their open positions, the potentiometers 239, 251 and 255, respectively, are applied to the power conductors +P and —P for stations 1 and 2, and the tie line. These potentiometers provide the + and — power representative voltages for each of the stations and the tie line. Since the potentiometer 255 is a manually controlled potentiometer and establishes the fixed value selected by the operator for the tie line power, this power input remains unchanged, until changed by the operator to simulate a future tie line condition. However, the power input over the switches 220 and 222 for stations 1 and 2, respectively, will be automatically changed to satisfy the system delivered power cost established by the λ potentiometer 229 adjusted by the operator.

The + and —P voltages for each of the stations and the tie line developed by the potentiometers 239, 251 and 255 are each applied to the potentiometers 109 through 204 driven by the system λ following motor 184 in accordance with the system λ established by the potentiometer 229. The voltage appearing on the output of each of the potentiometers 199 through 204 is then actually the λP voltages and is applied to the transmission loss network 75a to determine the transmission losses of the system.

The matrix-developed voltage is then applied through the conductors 75 and 109 to the summing amplifiers 225 and 226 along a λ voltage being received over the conductor 191 to control the amplifiers 225 and 226 to drive the motors 232 and 244 in accordance with the input voltages. The output of the motors 232 and 244 in turn drive the non-linear potentiometers 236 and 248 to provide station cost curve voltages over the feed-back circuits involving the conductors 237 and 249, respectively, for station characteristic inputs into the amplifiers 225 and 226, respectively. The motors 232 and 244 in turn drive the potentiometers 239 and 251, respectively, which has been explained hereinbefore, to provide + and −P voltages to the transmission loss matrix in proportion to the power output of the respective stations. It can be seen, therefore, that as the station motors 232 and 244 adjusts to the system λ established by the potentiometer 229 and fed into the amplifiers 225 and 226 over the conductor 191, the + and −P power voltages supplied to the inputs of the transmission loss matrix will also change. Adjustment of the motors 232 and 244 will, therefore, continue until the non-linear cost curve characteristic voltages of the potentiometers 236 and 248 provide a sufficient feedback into the amplifiers 225 and 226 to neutralize the sum of the system λ voltage being received over the conductor 191 plus transmission loss cost simulation received over conductors 75 and 109.

Also attached to the rotating shaft of the motors 232 and 244 are station cost indicators 242 and 254, respectively. When a stable condition is reached satisfying the system λ signal, the system power for the most economic dispatch of power from each of the stations can be read off the meters 242 or 252 associated with the particular station.

Since numerous changes may be made in the above-described construction and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. A loading control system for a plurality of generating stations and tie lines in a system network comprising a control center having sensing means for determining the tie line metering and system load changes for the total generation requirement of the system, cost integration means for developing output voltages for each station proportional to the integrated cost trend changes of the system and the cost of producing a unit of power at each station, swing participation sensing means for producing output voltages for each station proportional to rapid system load changes, cost of transmission loss sensing means for said system for producing input voltages for the cost integration means for control of each station proportional to the cost of transmission losses for the power supplied to the system by each station, summing means connected to said cost integration means and swing participation means for combining said cost integration output voltages and said swing participation output voltages to produce a single control signal for each station in the system.

2. A loading control system for a plurality of generating stations and tie lines in a system network comprising a control center having sensing means for determining the tie line metering and system load changes for the total generation requirement of the system, cost integration means for developing output voltages for each station proportional to the integrated cost trend changes of the system and the cost of producing a unit of power at each station, swing participation sensing means for producing output voltages for each station proportional to rapid system load changes, cost of transmission loss sensing means for said system for producing input voltages for the cost integration means for control of each station proportional to the cost of transmission losses for the power supplied to the system by each station, summing means connected to said cost integration means and swing participation means for combining said cost integration output voltages and said swing participation output voltages to produce a single control signal for each station in the system, and manual load adjusting means connected to said summing means to provide selective manual adjustment of each said station control signal.

3. A loading control system for a plurality of generating stations and tie lines in a system network comprising a control center having sensing means for determining the tie line metering and system load changes for the total generation requirement of the system, cost integration means for developing output voltages for each station proportional to the integrated cost trend changes of the system and the cost of producing a unit of power at each station, swing participation sensing means for producing output voltages for each station proportional to rapid system load changes, cost of transmission loss sensing means for said system for producing input voltages for the cost integration means for control of each station proportional to the cost of transmission losses for the power supplied to the system by each station, summing means connected to said cost integration means and swing participation means for combining said cost integration output voltages and said swing participation output voltages to produce a single control signal for each station in the system, and manual load adjusting means connected to said summing means to provide selective manual adjustment of each said station control signal, and unidirectional means in said cost integration means, swing participation means and load adjusting means connections to said summing means for limiting each station control to the highest output voltage encountered.

4. A loading control system for a plurality of generating stations and tie lines in a system network comprising a control center having sensing means for determining the tie line metering and system load changes for the total generation requirement of the system, cost integration means for developing output voltages for each station proportional to the integrated cost trend changes of the system and the cost producing a unit of power at each station, swing participation sensing means for producing output voltages for each station proportional to rapid system load changes, cost of transmission loss sensing means for said system for producing input voltages for the cost integration means for control of each station proportional to the cost of transmission losses for the power supplied to the system by each station, summing means connected to said cost integration means and swing participation means for combining said cost integration output voltages and said swing participation output voltages to produce a single control signal for each station in the system, said cost integration means comprising a magnetic amplifier for each station.

5. A loading control system for a plurality of generating stations and tie lines in a system network comprising a control center having sensing means for determining the tie line metering and system load changes for the total generation requirement of the system, cost integration means for developing output voltages for each station proportional to the integrated cost trend changes of the system and the cost of producing a unit of power at each station, swing participation sensing means for producing output voltages for each station proportional to rapid system load changes, cost of transmission loss sensing means for said system for producing input voltages in the cost integration means for control of each station proportional to the cost of transmission losses for the power supplied to the system by each station, summing means connected to said cost integration means and swing participation means for combining said cost integration output voltages and said swing participation output voltages to produce a single control signal for each station in the system, said cost integration means comprising a magnetic amplifier for each station, a system cost of lambda developing means connected to receive input signals from said sensing means to control the output of said lambda incremental cost developing means, control windings in said magnetic amplifiers connected to said lambda incremental cost developing means for the control of each magnetic amplifier in response to system requirement changes.

6. A loading control system for a plurality of generating stations and tie lines in a system network comprising a control center having sensing means for determining the tie line metering and system load changes for the total generation requirement of the system, cost integration means for developing output voltages for each station proportional to the integrated cost trend changes of the system and the cost of producing a unit of power at each station, swing participation sensing means for producing output voltages for each station proportional to rapid system load changes, cost of transmission loss sensing means for said system for producing input voltages for the cost integration means for control of each station proportional to the cost of transmission losses for the power supplied to the system by each station, summing means connected to said cost integration means and swing participation means for combining said cost integration output voltages and said swing participation output voltages to produce a single control signal for each station in the system, said cost integration means comprising a magnetic amplifier for each station, a system cost of lambda developing means connected to receive input signals from said sensing means to control the output of said lambda incremental cost developing means, control windings in said magnetic amplifiers connected to said lambda incremental cost developing means for the control of each magnetic amplifier in response to system requirement changes, bottom setting response bias means for each said magnetic amplifier for biasing each magnetic amplifier to produce an output to said summing means only when a selected incremental system cost level is reached making the production of power by the associated station economically desirable.

7. A loading control system for a plurality of generating stations and tie lines in a system network comprising a control center having sensing means for determining the tie line metering and system load changes for the total generation requirement of the system, cost integration means for developing output voltages for each station proportional to the integrated cost trend changes of the system and the cost of producing a unit of power at each station, swing participation sensing means for producing output voltages for each station proportional to rapid system load changes, cost of transmission loss sensing means for said system for producing input voltages for the cost integration means for control of each station proportional to the cost of transmission losses for the power supplied to the system by each station, summing means connected to said cost integration means and swing participation means for combining said cost integration output voltages and said swing participation output voltages to produce a single control signal for each station in the system, said cost integration means comprising a magnetic amplifier for each station, a system cost of lambda developing means connected to receive input signals from said sensing means to control the output of said lambda incremental cost developing means, control windings in said magnetic amplifiers connected to said lambda incremental cost developing means for the control of each magnetic amplifier in response to system requirement changes, bottom setting response bias means for each said magnetic amplifier for biasing each magnetic amplifier to produce an output to said summing means only when a selected incremental system cost level is reached making the production of power by the associated station economically desirable, said cost of transmission loss sensing means input to said cost integration means being through transmission loss bias windings on each said magnetic amplifier.

8. A loading control system for a plurality of generating stations and tie lines in a system network comprising a control center having sensing means for determining the tie line metering and system load changes for the total generation requirement of the system, cost integration means for developing output voltages for each station proportional to the integrated cost trend changes of the system and the cost of producing a unit of power at each station, swing participation sensing means for producing output voltages for each station proportional to rapid system load changes, cost of transmission loss sensing means for said system for producing input voltages for the cost integration means for control of each station proportional to the cost of transmission losses for the power supplied to the system by each station, summing means connected to said cost integration means and swing participation means for combining said cost integration output voltages and said swing participation output voltages to produce a single control signal for each station in the system, said cost integration means comprising a magnetic amplifier for each station, a system cost of lambda developing means connected to receive input signals from said sensing means to control the output of said lambda incremental cost developing means, control windings in said magnetic amplifiers connected to said lambda incremental cost developing means for the control of each magnetic amplifier in response to system requirement changes, bottom setting response bias means for each said magnetic amplifier for biasing each magnetic amplifier to produce an output to said summing means only when a selected incremental system cost level is reached making the production of power by the associated station economically desirable, and slope setting means in said summing means for changing the response curve of each said magnetic amplifier in proportion to said bottom setting response bias means.

9. A loading control system for a plurality of generating stations and tie lines in a system network comprising a control center having sensing means for determining the tie line metering and system load changes for the total generation requirement of the system, cost integration means for developing output voltages for each station proportional to the integrated cost trend changes of the system and the cost of producing a unit of power at each station, swing participation sensing means for producing output voltages for each station proportional to rapid system load changes, cost of transmission loss sensing means for said system for producing input voltages for the cost integration means for control of each station proportional to the cost of transmission losses for the power supplied to the system by each station, summing means connected to said cost integration means and swing participation means for combining said cost integration output voltages and said swing participation output voltages to produce a single control signal for each station in the system, said cost integration means comprising a magnetic amplifier for each station, a system cost of lambda developing means connected to receive input signals from said sensing means to control the output of said lambda incremental cost developing means, control windings in said magnetic amplifiers connected to said lambda incremental cost developing means for the control of each magnetic amplifier in response to system requirement changes, bottom setting response bias means for each said magnetic amplifier for biasing each magnetic amplifier to produce an output to said summing means only when a selected incremental system cost level is reached making the production of power by the associated station economically desirable, and slope setting means in said summing means for changing the response curve of each said magnetic amplifier in proportion to said bottom setting response bias means, said slope and bottom setting means comprising potentiometers connected together for simultaneous movement.

10. A loading control system for a plurality of generating stations and tie lines in a system network comprising a control center having sensing means for determining the tie line metering and system load changes for the total generation requirement of the system, cost integration means for developing output voltages for each station proportional to the integrated cost trend changes of the system and the cost of producing a unit of power at each station, swing participation sensing means for producing output voltages for each station proportional to rapid system load changes, cost of transmission loss sensing means for said system for producing input voltages for the cost integration means for control of each station proportional to the cost of transmission losses for the power supplied to the system by each station, summing means connected to said cost integration means and swing participation means for combining said cost integration output voltages and said swing participation output voltages to produce a single control signal for each station in the system, said swing participtation sensing means comprising a magnetic amplifier connected to respond to said sensing means, an output circuit for said swing magnetic amplifier comprising a plurality of parallel connected swing potentiometers, said swing potentiometers being connected one to each summing means for each station with each potentiometer being adjusted to the participation desired for the station.

11. A loading control system for a plurality of generating stations and tie lines in a system network comprising a control center having sensing means for determining the tie line metering and system load changes for the total generation requirement of the system, cost integration means for developing output voltages for each station proportional to the integrated cost trend changes of the system and the cost of producing a unit of power at each station, swing participation sensing means for producing output voltages for each station proportional to rapid system load changes, cost of transmission loss sensing means for said system for producing input voltages for the cost integration means for control of each station proportional to the cost of transmission losses for the power supplied to the system by each station, summing means connected to said cost integration means and swing participation means for combining said cost integration output voltages and said swing participation output voltages to produce a single control signal for each station in the system, said cost integration means comprising a magnetic amplifier for each station, said cost of transmission loss sensing means comprising station and tie line power output detecting means for producing input signals from each of said stations and tie lines, system lambda follower means connected to said cost of lambda developing means to provide an amplified output proportional to said cost of lambda developing means output, lambda follower multiplying means for said lambda developing means connected to said station and tie line power output detecting means to produce algebraically combined outputs for each station and tie line, a transmission loss resistance matrix connected to said lambda follower multiplying means to develop a loss output voltage for each station, said lambda follower means output being algebraically combined with each station loss output voltage to produce a transmission loss control voltage for each said cost integration means magnetic amplifier.

12. A loading control system for a plurality of generating stations and tie lines in a system network comprising a control center having sensing means for determining the tie line metering and system load changes for the total generation requirement of the system, cost integration means for developing output voltages for each station proportional to the integrated cost trend changes of the system and the cost of producing a unit of power at each station, swing participation sensing means for producing output voltages for each station proportional to rapid system load changes, cost of transmission loss sensing means for said system for producing input voltages for the cost integration means for control of each station proportional to the cost of transmission losses for the power supplied to the system by each station, summing means connected to said cost integration means and swing participation means for combining said cost integration output voltages and said swing participation output voltages to produce a single control signal for each station in the system, said cost integration means comprising a magnetic amplifier for each station, said cost of transmission loss sensing means comprising station and tie line power output detecting mean for producing input signals from each of said stations and tie lines, system lambda follower means connected to said cost of lambda developing means to provide an amplified output proportional to said cost of lambda developing means output, lambda follower multiplying means for said lambda developing means connected to said station and tie line power output detecting means to produce algebraically combined outputs for each station and tie line, a transmission loss resistance matrix connected to said lambda follower multiplying means to develop a loss output voltage for each station, said lambda follower means output being algebraically combined with each station loss output voltage to produce a transmission loss control voltage for each said cost integration means magnetic amplifier, a second bias winding on each said magnetic amplifier connected to receive said transmission loss control voltage.

13. A loading control system for a plurality of generating stations and tie lines in a system network comprising a control center having sensing means for determining the tie line metering and system load changes for the total generation requirement of the system, cost integration means for developing output voltages for each station proportional to the integrated cost trend changes of the system and the cost of producing a unit of power at each station, swing participation sensing means for producing output voltages for each station proportional to rapid system load changes, cost of transmission loss sensing means for said system for producing input voltages for the cost integration means for control of each station proportional to the cost of transmission losses for the power supplied to the system by each station, summing means connected to said cost integration means and swing participation means for combining said cost integration output voltages and said swing participation output voltages to produce a single control signal for each station in the system, said cost integration means comprising a magnetic amplifier for each station, said cost of transmission loss sensing means comprising station and tie line power output detecting means for producing input signals from each of said stations and tie lines, system lambda follower means connected to said cost of lambda developing means to provide an amplified output proportional to said cost of lambda developing means output, lambda follower multiplying means for said lambda developing means connected to said station and tie line power output detecting means to produce algebraically combined outputs for each station and tie line, a transmission loss resistance matrix connected to said lambda follower multiplying means to develop a loss output voltage for each station, said lambda follower means output being algebraically combined with each station loss output voltage to produce a transmission loss control voltage for each said cost integration means magnetic amplifier, manual lambda follower control voltage developing means, manual simulation transmission loss means, and first switching means for connecting said manual follower control voltage developing to said lambda follower means and for removing said transmission loss control voltages from said magnetic amplifiers and connecting said manual simulation transmission loss means to said magnetic amplifiers.

14. A loading control system for a plurality of generating stations and tie lines in a system network comprising a control center having sensing means for determining the tie line metering and system load changes for for the total generation requirement of the system, cost integration means for developing output voltages for each station proportional to the integrated cost trend changes of the system and the cost of producing a unit of power at each station, swing participation sensing means for producing output voltages for each station proportional to rapid system load changes, cost of transmission loss sensing means for said system for producing input voltages for the cost integration means for control of each station proportional to the cost of transmission losses for the power supplied to the system by each station, summing means connected to said cost integration means and swing participation means for combining said cost integration output voltages and said swing participation output voltages to produce a single control signal for each station in the system, said cost integration means comprising a magnetic amplifier for each station, said cost of transmission loss sensing means comprising station and tie line power output detecting means for producing input signals from each of said stations and tie lines, system lambda follower means connected to said cost of lambda developing means to provide an amplified output proportional to said cost of lambda developing means output, lambda follower multiplying means for said lambda developing means connected to said station and tie line power output detecting means to produce algebraically combined outputs for each station and tie line, a transmission loss resistance matrix connected to said lambda follower multiplying means to develop a loss output voltage for each station, said lambda follower means output being algebraically combined with each station loss output voltage to produce a transmission loss control voltage for each said cost integration means magnetic amplifier, manual lambda follower control voltage developing means, manual simulation transmission loss means, and first switching means for connecting said manual follower control voltage developing to said lambda follower means and for removing said transmission loss control voltages from said magnetic amplifiers and connecting said manual simulation transmission loss means to said magnetic amplifiers, manual station power simulating voltage means connected by a second switching means to said transmission loss matrix, said first switching means also simultaneously interrupting any station and tie line power output detecting means signals, and transmission loss indicating means for each station connected to the output of said transmission loss matrix by said first switching means when said transmission loss control voltages are removed from said magnetic amplifiers.

15. A loading control system for a plurality of generating stations and tie lines in a system network comprising a control center having sensing means for determining the tie line metering and system load changes for the total generation requirement of the system, cost integration means for developing output voltages for each station proportional to the integrated cost trend changes of the system and the cost of producing a unit of power at each station, swing participation sensing means for producing output voltages for each station proportional to rapid system load changes, cost of transmission loss sensing means for said system for producing input voltages for the cost integration means for control of each station proportional to the cost of transmission losses for the power supplied to the system by each station, summing means connected to said cost integration means and swing participating means for combining said cost integration output voltages and said swing participation output voltages to produce a single control signal for each station in the system, said cost integration means comprising a magnetic amplifier for each station, a system cost of lambda developing means connected to receive input signals from said sensing means to control the output of said lambda incremental cost developing means, control windings in said magnetic amplifiers connected to said lambda incremental cost developing means for the control of each magnetic amplifier in response to system requirement changes, said magnetic amplifier control windings being series connected to said system cost of lambda developing means.

16. A loading control system for a plurality of generating stations and tie lines in a system network comprising a control center having sensing means for determining the tie line metering and system load changes for the total generation requirement of the system, cost integration means for developing output voltages for each station proportional to the integrated cost trend changes of the system and the cost of producing a unit of power at each station, swing participation sensing means for producing output voltages for each station proportional to rapid system load changes, cost of transmission loss sensing means for said system for producing input voltages for the cost integration means for control of each station proportional to the cost of transmission losses for the power supplied to the system by each station, summing means connected to said cost integration means and swing participating means for combining said cost integration output voltages and said swing participation output voltages to produce a single control signal for each station in the system, said cost integration means comprising a magnetic amplifier for each station, a system cost of lambda developing means connected to receive input signals from said sensing means to control the output of said lambda incremental cost developing means, control windings in said magnetic amplifiers connected to said lambda incremental cost developing means for the control of each magnetic amplifier in response to system requirement changes, said magnetic amplifier control windings being series connected to said system cost of lambda developing means, and parallel connected variable resistors for each control winding of said magnetic amplifiers for adjusting the cost of lambda control signal necessary for the desired magnetic amplifier control.

17. A loading control system for a plurality of generating stations and tie lines in a system network comprising a control center having sensing means for determining the tie line metering and system load changes for the total generation requirement of the system, cost integration means for developing output voltages for each station proportional to the integrated cost trend changes of the system and the cost of producing a unit of power at each station, swing participation sensing means for producing output voltages for each station proportional to rapid system load changes, cost of transmission loss sensing means for said system for producing input voltages for the cost integration means for control of each station proportional to the cost of transmission losses for the power supplied to the system by each station, summing means connected to said cost integration means and swing participation means for combining said cost integration output voltages and said swing participation output voltages to produce a single control signal for each station in the system, a plurality of generators in each station, station control means for each generating station, said station control means comprising non-linear cost of power generation means for each generator for producing a control signal for each generator dictating its load share of the station load signal from the control center.

18. A loading control system for a plurality of generating stations and tie lines in a system network comprising a control center having sensing means for determining the tie line metering and system load changes for the total generation requirement of the system, cost integration means for developing output voltages for each station proportional to the integrated cost trend changes of the system and the cost of producing a unit of power at each station, swing participation sensing means for producing output voltages for each station proportional to rapid system load changes, cost of transmission loss sensing means for said system for producing input voltages for the cost integration means for control of each station proportional to the cost of transmission losses for the power supplied to the system by each station, summing means connected to said cost integration means and swing participation means for combining said cost integration output voltages and said swing participation output voltages to produce a single control signal for each station in the system, a plurality of generators in each station, station control means for each generating station, said station control means comprising non-linear cost of power generation means for each generator for producing a control signal for each generator dictating its load share of the station load signal from the control center, and feedback means for the control of each generator, said feedback means being connected to respond to the output of each generator.

19. A loading control system for a plurality of generating stations and tie lines in a system network comprising a control center having sensing means for determining the tie line metering and system load changes for the total generation requirement of the system, cost integration means for developing output voltages for each station proportional to the integrated cost trend changes of the system and the cost of producing a unit of power at each station, swing participation sensing means for producing output voltages for each station proportional to rapid system load changes, cost of transmission loss sensing means for said system for producing input voltages for the cost integration means for control of each station proportional to the cost of transmission losses for the power supplied to the system by each station, summing means connected to said cost integration means and swing participation means for combining said cost integration output voltages and said swing participation output voltages to produce a single control signal for each station in the system, a plurality of generators in each station, station control means for each generating station, said station control means comprising non-linear cost of power generation means for each generator for producing a control signal for each generator dictating its load share of the station load signal from the control center, said station control means further comprising a motor positioning device for said non-linear cost power generating means, and angle positioning circuit means for positioning said motor device to the proper incoming control center signal.

20. A loading control system for a plurality of generating stations and tie lines in a system network comprising a control center having sensing means for determining the tie line metering and system load changes for the total generation requirement of the system, cost integration means for developing output voltages for each station proportional to the integrated cost trend changes of the system and the cost of producing a unit of power at each station, swing participation sensing means for producing output voltages for each station proportional to rapid system load changes, cost of transmission loss sensing means for said system for producing input voltages for the cost integration means for control of each station proportional to the cost of transmission losses for the power supplied to the system by each station, summing means connected to said cost integration means and swing participation means for combining said cost integration output voltages and said swing participation output voltages to produce a single control signal for each station in the system, a plurality of generators in each station, station control means for each generating station, said station control means comprising non-linear cost of power generation means for each generator for producing a control signal for each generator dictating its load share of the station load signal from the control center, said station control means further comprising a motor positioning device for said non-linear cost of power generating means, and angle positioning circuit means for positioning said motor device to the proper incoming control center signal, said non-linear cost of power generating means for each generator comprising a non-linear potentiometer.

21. A loading control system for a plurality of generating stations and tie lines in a system network comprising a control center having sensing means for determining the tie line metering and system load changes for the total generation requirement of the system, cost integration means for developing output voltages for each station proportional to the integrated cost trend changes of the system and the cost of producing a unit of power at each station, swing participation sensing means for producing output voltages for each station proportional to rapid system load changes, cost of transmission loss sensing means for said system for producing input voltages for the cost integration means for control of each station proportional to the cost of transmission losses for the power supplied to the system by each station, summing means connected to said cost integration means and swing participation means for combining said cost integration output voltages and said swing participation output voltages to produce a single control signal for each station in the system, a plurality of generators in each station, station control means for each generating station, said station control means comprising non-linear cost of power generation means for each generator for producing a control signal for each generator dictating its load share of the station load signal from the control center, and transducer means for summing the total output of all generators in each station for providing a power generation signal to the control center for transmission loss bias control.

22. A loading control system for a plurality of generating stations and tie lines in a system network comprising a control center having sensing means for determining the tie line metering and system load changes for the total generation requirement of the system, cost integration means for developing output voltages for each station proportional to the integrated cost trend changes of the system and the cost of producing a unit of power at each station, swing participation sensing means for producing output voltages for each station proportional to rapid system load changes, cost of transmission loss sensing means for said system for producing input voltages for the cost integration means for control of each station proportional to the cost of transmission losses for the power supplied to the system by each station, summing means connected to said cost integration means and swing participation means for combining said cost integration output voltages and said swing participation output voltages to produce a single control signal for each station in the system, said cost integration means comprising a magnetic amplifier for each station, said cost of transmission loss sensing means comprising station and tie line power output detecting means for producing input signals from each of said stations and tie lines, system lambda follower means connected to said cost of lambda developing means to provide an amplified output proportional to said cost of lambda developing means output, lambda follower multiplying means for said lambda developing means connected to said station and tie line power output detecting means to produce algebraically combined outputs for each station and tie line, a transmission loss resistance matrix connected to said lambda follower multiplying means to develop a loss output voltage for each station, said lambda follower means output being algebraically combined with each station loss output voltage to produce a transmission loss control voltage for each said cost integration means magnetic amplifier, manual lambda follower control voltage developing means, manual simulation transmission loss means, and first switching means for connecting said manual follower control voltage developing to said lambda follower means and for removing said transmission loss control voltages from said magnetic amplifiers and connecting said manual simulation transmission loss means to said magnetic amplifiers, transmission loss indicating means for each station comprising control amplifiers for positioning station power indicators in response to the system lambda follower output voltage, simulated station power voltage developing means controlled by said control amplifiers and selectively connected to provide an input to the lambda follower multiplying means for each station during manual system lambda follower control, second switching means for removing said station and the line power output detecting means control and applying said simulated station power voltage, and manual tie line power setting means for providing manually established power voltage input to said lambda follower multiplying means for said tie lines during manual system lambda follower control.

References Cited in the file of this patent

UNITED STATES PATENTS

| | | |
|---|---|---|
| 2,773,994 | Cohn | Dec. 11, 1956 |
| 2,836,730 | Early | May 27, 1958 |
| 2,839,692 | Kirchmayer | June 17, 1958 |